United States Patent [19]

Moriyama

[11] Patent Number: 4,867,667
[45] Date of Patent: Sep. 19, 1989

[54] APPARATUS FOR PRODUCING SCREW FEEDERS FOR A PLASTIC INJECTION-MOLDING MACHINE

[76] Inventor: Masao Moriyama, No. 508-13, Tendocho 17, Nishinomiya, Hyogo, 663, Japan

[21] Appl. No.: 201,596

[22] Filed: May 31, 1988

[30] Foreign Application Priority Data

May 29, 1987 [JP] Japan .................................. 62-136189
May 29, 1987 [JP] Japan .................................. 62-136190

[51] Int. Cl.$^4$ ....................... B29C 47/24; B29C 47/38
[52] U.S. Cl. ........................................ 425/190; 264/167;
264/209.2; 264/310; 425/206; 425/207;
425/381; 425/382.3; 425/465; 425/466;
425/542
[58] Field of Search ..................... 264/167, 174, 209.2,
264/279, 310; 425/110, 113, 190, 197, 206, 207,
381, 382.3, 465, 466, 467, 542

[56] References Cited

U.S. PATENT DOCUMENTS

| | | | |
|---|---|---|---|
| 2,893,056 | 7/1959 | Hennins | 425/113 |
| 3,461,499 | 8/1969 | Nevin et al. | 425/113 |
| 3,932,090 | 1/1976 | Brumlik | 425/381 |
| 4,181,486 | 1/1980 | Saito | 425/113 |
| 4,281,978 | 8/1981 | Shigematsu | 425/382.3 |
| 4,395,210 | 7/1983 | Hama | 425/381 X |
| 4,455,133 | 6/1984 | Jakob et al. | 425/113 |
| 4,548,567 | 10/1985 | Missout | 425/113 |

FOREIGN PATENT DOCUMENTS

| | | | |
|---|---|---|---|
| 2519705 | 11/1976 | Fed. Rep. of Germany | 264/167 |
| 57-131521 | 8/1982 | Japan | 264/167 |
| 2016354 | 9/1979 | United Kingdom | 264/310 |

Primary Examiner—Jeffery Thurlow
Assistant Examiner—Leo B. Tentoni
Attorney, Agent, or Firm—Koda and Androlia

[57] ABSTRACT

A system for producing a screw feeder for use in a plastic injection-molding machine, according to which system a molten material is extruded through an injection opening of a rotating die, the injection opening of the die including a groove obliquely with respect to the axis thereof, thereby forming a screw feeder having a shank and a spiral integral lengthwise therewith.

2 Claims, 5 Drawing Sheets

FIG.8
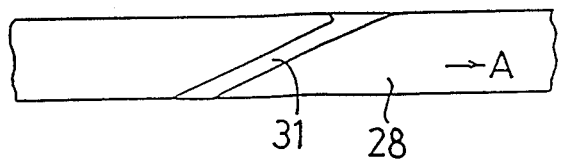
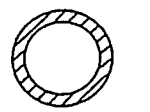   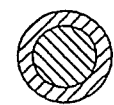
FIG.9(a) FIG.9(b) FIG.9(c) FIG.9(d)

APPARATUS FOR PRODUCING SCREW FEEDERS FOR A PLASTIC INJECTION-MOLDING MACHINE

BACKGROUND AND SUMMARY

The present invention relates to a method and apparatus for producing screw feeders for use in a plastic injection-molding machine, wherein the screw feeder includes a shank having a spiral integral lengthwise therewith. As the shank revolves, the turning spiral feeds a material placed in a cylindrical container, wherein the material includes a powder, pellets, or a slurry-like substance.

To feed a powdery or pasty material the common practice is to employ a pneumatic conveyor which consists essentially a hopper and a compressed air intake device both provided at one end of a cylindrical container, and a separator provided at the other end thereof. The separator is intended to separate the air from the material. The compressed air is intermittently supplied and feeds the material.

One disadvantage of this known conveyor system is that the mechanism becomes complicated because of the provision of the air intake device for intermittently introducing compressed air and the separator for separating the air from the material. Another disadvantage is a low feeding speed because of the necessity of mixing air with the material. The known injecting die is fixed to a mouthpiece, so that the molded objects passed therethrough have a constant cross-section.

The present invention is directed toward a method and apparatus for producing screw feeders for use in a plastic injection-molding machine which solve the problems discussed above. Thus an object of the present invention is to provide a method and apparatus for producing screw feeders on mass-production basis.

This object is achieved by providing an apparatus which comprises a stationary die provided in a material conveying cylinder, a rotary die provided coaxially in the cylinder, the stationary die being located inward of the rotary die, the rotary die including an opening in the center, the inner surface defining the opening including a groove produced obliquely with respect to the axis of the rotary die, the stationary die taking the form of a top having a head and a leg extending through the opening of the rotary die, and means for driving the rotary die.

The object of the present invention is also achieved by providing another version of the apparatus which comprises a molten material storing chamber located in an injecting opening of a cylinder, the material storing chamber including a pair of apertures having a common axis perpendicular to the direction in which the molten material is extruded, the pair of apertures being adapted to support a core rod rotatively, a rotary die provided in one of the apertures, the rotary die having an opening in the center so as to allow the molten material to pass through, the inner surface defining the opening including a groove produced obliquely with respect to the axis of the rotary die, and means for driving the rotary die.

BRIEF DESCRIPTION OF THE DRAWINGS

FIG. 8 is a fragmentary view on an enlarged scale of the opening of the rotary die used in the apparatus; and FIGS. 9 (a) and (d) are cross-sections showing various cores embedded in the screw feeder.

DETAILED DESCRIPTION OF THE INVENTION

Figure 1:
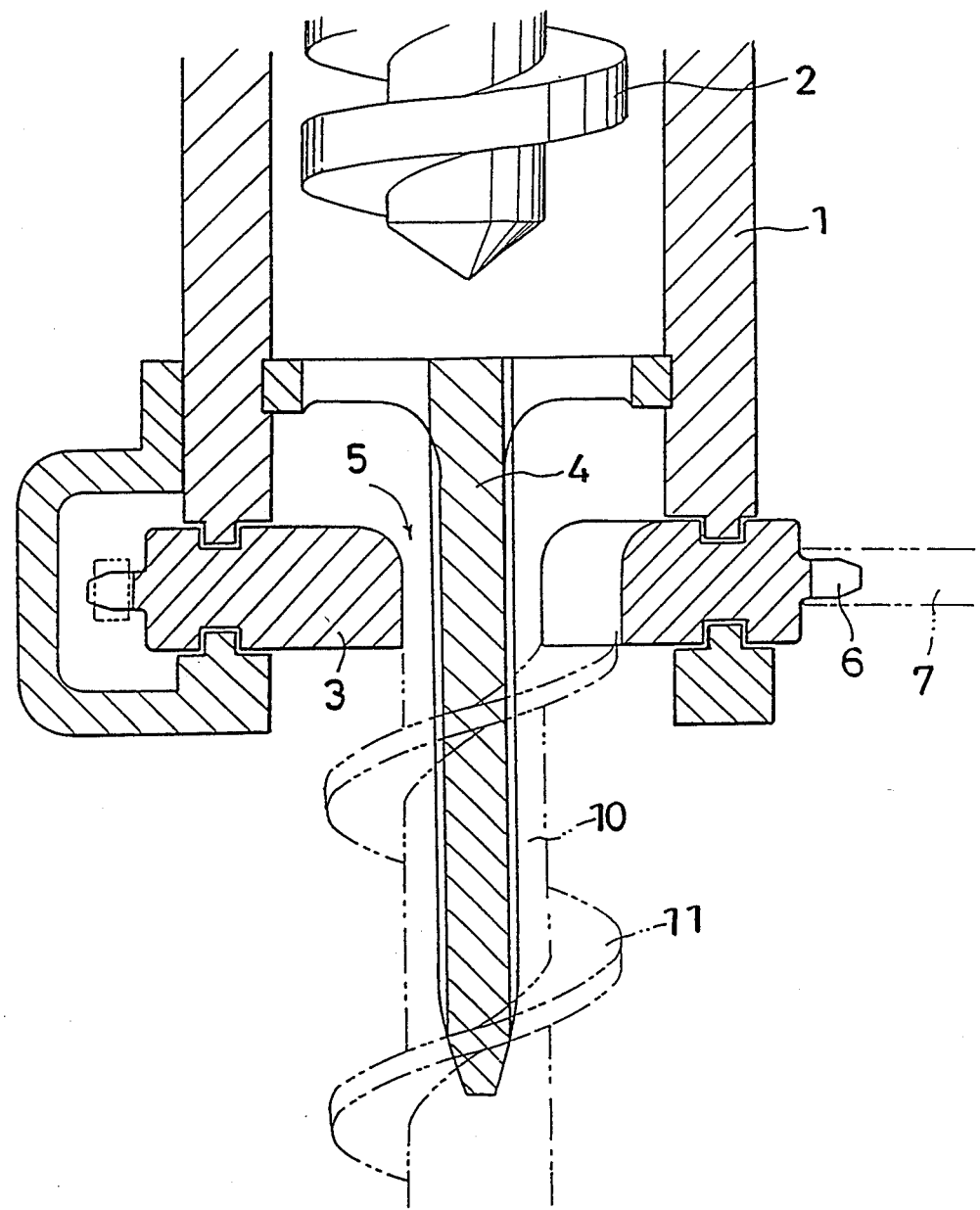
FIG. 1 is a vertical cross-section through an apparatus according to an embodiment of the present invention.

Referring to FIG. 1 there is provided an plastic injection-molding machine which has a cylinder 1 in which a feed screw 2 is provided for forcing out pellets placed in the cylinder 1 through an outlet thereof. The outlet of the cylinder 1 has a rotary die 3 and a stationary die 4, the stationary die being located inward of the rotary die.

The rotary die 3 is a disc-shaped plate, having a round aperture 5 in the center and a sprocket 6 around its periphery on which a chain 7 runs. As the chain 7 is driven, the rotary die 3 is rotated. The inner surface of the aperture 5 is provided with a groove 8 produced obliquely with respect to the axis of the die 3.

Figure 3:
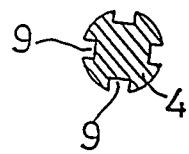
FIG. 3 is a cross-sectional view showing a stationary die.

The stationary die 4 takes the form of a top having a head and a leg. The head is fixed to the cylinder 1 concentrically of the aperture 5 of the rotary die 3, and the leg, as best shown in FIG. 3, is provided with grooves 9 axially produced and extends through the aperture 5 of the rotary die 3.

Figure 2:
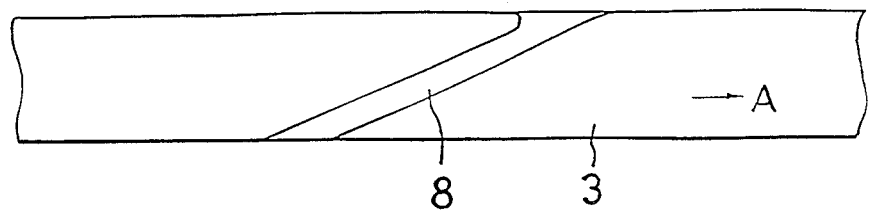
FIG. 2 is a fragmentary view on an enlarged scale of the opening of a rotary die, particulary showing a groove obliquely produced therein.
Figure 4:
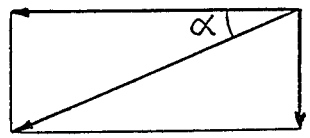
FIG. 4 is a diagrammatic view explaining the operation of the present invention.

The rotary die 3 is rotated in the direction of arrow (A) in FIG. 2 so that it can extrude the molten material spirally. The speed of rotation is controlled on the basis of the extruding speed of the material and the angle of decline of the oblique groove 8. In FIG. 4 $\alpha$ indicates a lead angle, which depends upon the rotating speed of the rotary die 3 and the extruding speed of the material. The lead angle $\alpha$ needs not be equal to the angle of decline of the oblique groove 8. The lead angle $\alpha$ determines a direction in which the material is spirally molded.

As shown in dots in FIG. 1 the molded object comprises a shank 10 and a spiral 11 integral lengthwise therewith. The central portion of the shank 10 is hollowed by the leg of the stationary die 4. When a soft plastic is used, the molded object can be of resilient nature.

Figure 5:
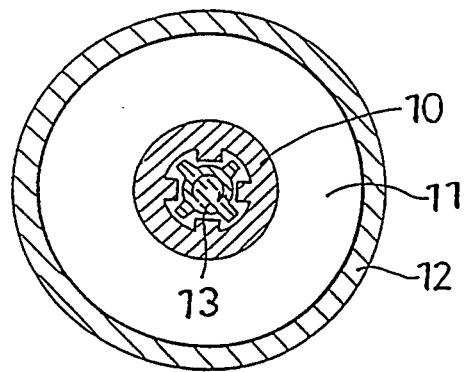
FIG. 5 is a diagrammatic view explaining the operation of a screw feeder produced under the present invention.

As clearly shown in FIG. 5, the molded object is inserted into a flexible tube 12, and accommodates a driving shaft 13 in the hollow shank 10. The spiral 11 keeps tight contact with the inner wall of the flexible tube 12, and the ridges of the driving shaft 13 are engaged with the grooves 9. In this way the drive is imparted to the screw feeder through the driving shaft 13.

Figure 6:
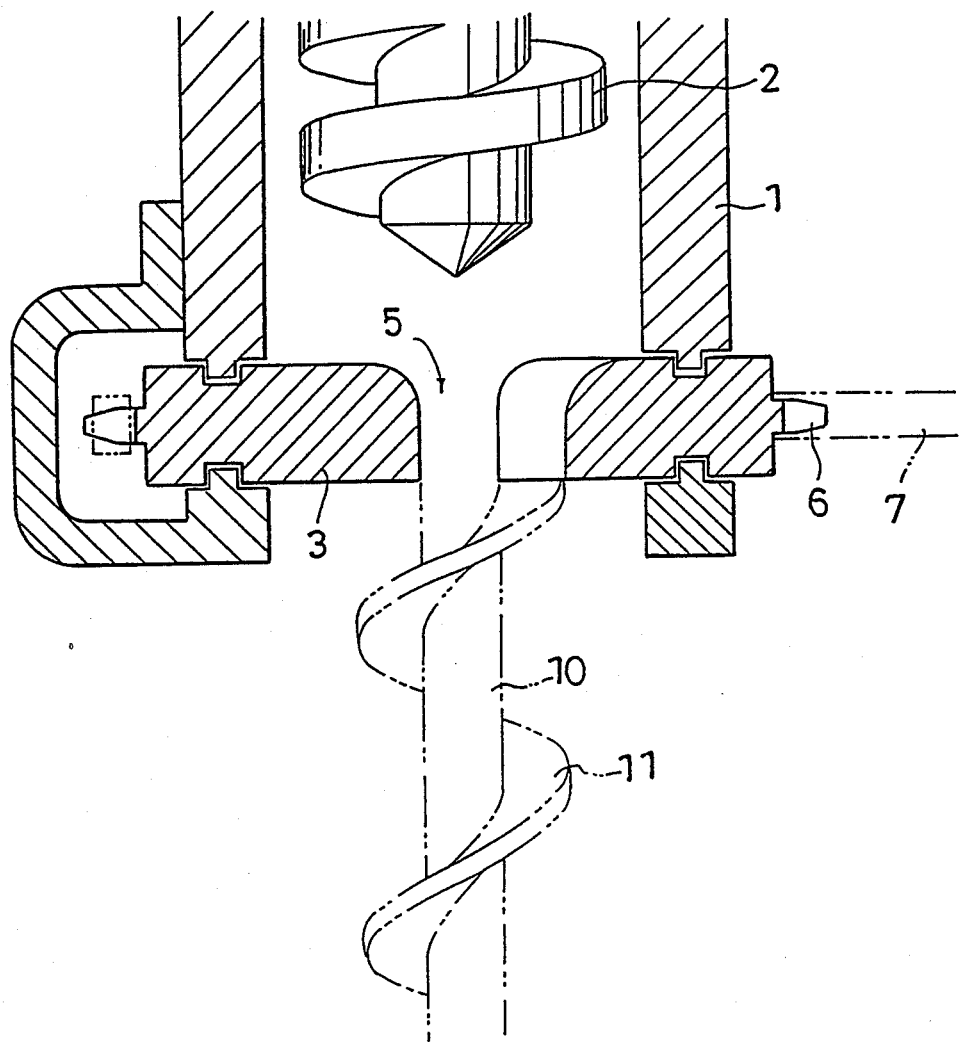
FIG. 6 is a vertical cross-section showing a modified version of the embodiment of the present invention.

FIG. 6 shows a modified version of the embodiment, which is different from that described above with reference to FIG. 1 in that no stationary die 4 is provided.

Figure 7:
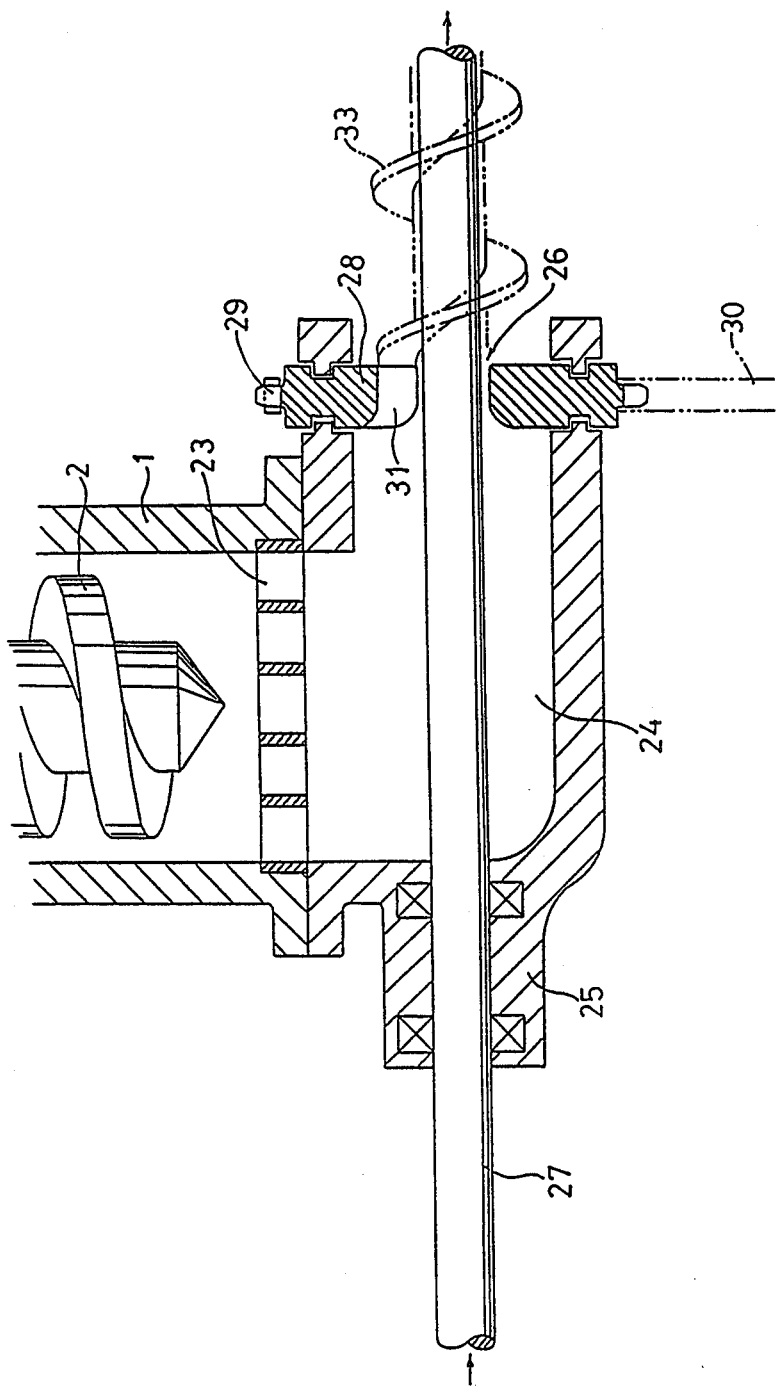
FIG. 7 is a vertical cross-section showing a further modified version of the embodiment of the present invention.

FIG. 7 shows a further modified version of the embodiment, which will be described in detail:

This embodiment is provided with a plate 23 at the outlet, the plate 23 defining a molten material storing chamber 24 outside the outlet. The molten material storing chamber 24 includes apertures 25 and 26 having a common axis perpendicular to the direction in which the molten material is extruded, through which a rod 27 is rotatively supported. While in rotation, the rod 27 is moved perpendicularly to the direction in which the molten material is extruded, that is, the direction shown by the arrow in FIG. 7. The reference numeral 28 denotes a rotary die fixed in the aperture 26, the die 28 being provided with a sprocket 29 around its periphery on which a chain 30 runs. The chain 30 is driven by an electric motor (not shown). The rotary die 28 has an opening having a larger diameter than that of the rod 27. The inner surface of the die 28 has a groove 31 produced obliquely with respect to the axis thereof, as shown in FIG. 8. The molten material is extruded through the plate 23 while the rotary die 28 is in rotation and the rod 27 is moved in the direction of arrow. The rod 27 will be described in detail below:

The rod 27 can be made of metal or plastic, which has a higher melting point than that of the molding plastic. The rod 27 is conveyed by a conveyor installed on a table (not shown). The rod 27 can have cross-sections of various shapes not shown in FIG. 9; a hollow type (a), a type having a grooved bore (b), a solid type (c), or a two layer type (d).

The rotary die 28 is rotated in the direction of arrow (A) in FIG. 8 so that it can extrude the molten material spirally around the rod 27. The rotating speed is controlled on the basis of the feeding speed of the rod 27 and the angle of decline of the slant groove 31. The lead angle α needs not be equal to the angle of decline of the slant groove 31.

As shown in dots in FIG. 7 the molded object comprises the rod 27 and a spiral 33 integral lengthwise therewith. The rod 27 functions as a core. When a soft plastic is used, the molded object can be resilient. The molded object is inserted into a plastic tube. In this way a resilient screw feeder is obtained. The resilient molded object is of particular advantage because it can be tightly accommodated in the tube. When the tube and the rod 27 are both made of soft plastic, the screw feeder as a whole can be of resilient nature. If all the rods are short, cut to a fixed length, a desired number of rods are connected into a single rod by means of joints. When the rod 27 has a cross-section shown in FIG. 9(b) the drive is imparted to the rod 27 with the minimum loss of it, thereby stepping up the torque to the screw feeder.

A cooling device can be employed in association with the molding machine so as to cool the molded object, which is preferably located in front of the rotary die 3 in FIGS. 3 to 6, or the rotary die 28 in FIG. 7.

What is claimed is:

1. An apparatus for producing a screw feeder for use in a plastic injection-molding machine, the apparatus comprising a stationary die provided in a molten material conveying cylinder, a rotary die provided coaxially in the cylinder, the stationary die being located inward of the rotary die, the rotary die including an opening in its center, an inner surface defining the opening including a groove produced obliquely with respect to an axis of the rotary die, the stationary die taking a form of a top having a head and a leg extending through the opening of the rotary die, and means for driving the rotary die.

2. An apparatus for producing a screw feeder for use in a plastic injection-molding machine, said apparatus comprising:
   a molten material conveying cylinder;
   a molten material extruding rotary screw located coaxially in said cylinder;
   a rotary die located at an outlet of said cylinder, said rotary die being provided with a central aperture having its inner surface grooved obliquely with respect to an axis of said rotary die;
   a stationary die taking a top-like form having a disc-shaped head and a leg, said stationary die being kept stationery with said dis-shaped head fixed, between said rotary screw and said rotary die, to its inner surface of said cylinder with said central leg made to partially protrude outside of said cylinder through said central aperture of said rotary die; and
   a driving means for rotating said rotary die.

* * * * *